United States Patent [19]

Taguchi

[11] Patent Number: 4,493,662
[45] Date of Patent: Jan. 15, 1985

[54] SHAFT CONNECTING DEVICE FOR BOAT PROPELLERS

[75] Inventor: Michihiro Taguchi, Hamamatsu, Japan

[73] Assignees: Yamaha Hatsudoki Kabushiki Kaisha; Sanshin Kogyo Kabushiki Kaisha, both of Japan

[21] Appl. No.: 373,026

[22] Filed: Apr. 28, 1982

[51] Int. Cl.³ ............................................ B63H 21/28
[52] U.S. Cl. ...................................... 440/83; 440/86; 440/75; 277/31; 277/47; 277/208; 277/207 R; 403/50; 464/173
[58] Field of Search ............... 277/31, 47, 208, 212 C, 277/207 R, 178, 200, 214; 403/50, 298; 440/83, 52, 86, 64, 75, 76; 464/173, 175, 49, 131

[56] References Cited

U.S. PATENT DOCUMENTS

| | | | |
|---|---|---|---|
| 2623490 | 12/1952 | Kiekhaefer | 440/75 |
| 2682248 | 6/1954 | Sitz | 440/86 |
| 2718792 | 9/1955 | Kiekhaefer | 440/76 |
| 2728320 | 12/1955 | Kloss | 440/86 |
| 2729186 | 1/1956 | Kloss | 440/86 |
| 2749757 | 6/1956 | Adect | 403/50 |
| 2916007 | 12/1959 | Kiekhaefer | 440/52 |
| 3016722 | 1/1962 | Batdorf | 277/208 |
| 3404573 | 10/1968 | Cull | 403/50 |
| 3430604 | 3/1969 | Pike | 440/52 |
| 3547474 | 12/1970 | Colletti | 403/50 |

FOREIGN PATENT DOCUMENTS 1182572 9/1957 France ............................. 440/64

Primary Examiner—Trygve M. Blix
Assistant Examiner—Patrick W. Young
Attorney, Agent, or Firm—Ernest A. Beutler

[57] ABSTRACT

A shaft connecting device for the outboard drive of a marine engine consisting of a pair of shafts having a splined connection. A seal is fixed to one of these shafts for providing a seal to this shaft and has a portion sealingly engaged with the second shaft for protecting the splined connection from the ingress of foreign material.

5 Claims, 5 Drawing Figures

SHAFT CONNECTING DEVICE FOR BOAT PROPELLERS

BACKGROUND OF THE INVENTION

This invention relates to a shaft connecting device and more particularly to an improved shaft connection for use in the outboard drives of a marine engine.

In many instances, splined connections are employed in shafts that extend through the outboard drive of an outboard engine or of an inboard/outboard marine arrangement. The use of such splined connections facilitates production, assembly and servicing. However, the splined connection is frequently located in an area where it will be exposed to the water in which the boat is operated. The water may cause contaminants to enter into the splined connection or can cause corrosion in the area of the splines. Obviously, either effect will cause clearances to develop in the splined connection resulting in poor connections.

It is, therefore, a principal object of this invention to provide a improved shaft connection for marine application.

It is another object of the invention to provide a marine splined connection wherein the splines are protected from contaminants.

SUMMARY OF THE INVENTION

This invention is adapted to be embodied in a shaft connection for the outboard drive of a marine engine or the like comprising a first shaft, a second shaft and connecting means affixed to the first shaft and operatively connected to the second shaft for coupling the shafts together. In accordance with the invention, a seal member is fixed to the coupling member and sealingly engaged with the second shaft.

PRIOR ART

Figure 1:
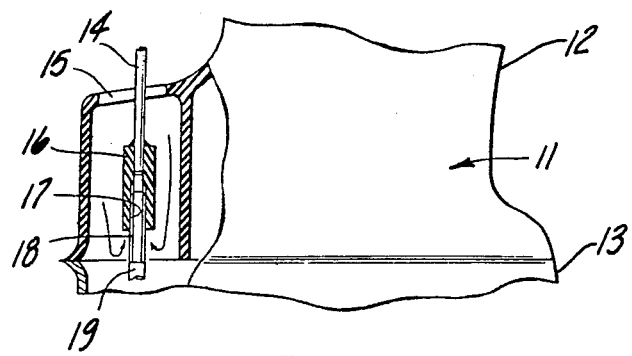
FIG. 1 is a partial side elevational view, with a portion broken away, of an outboard drive constructed in accordance with the prior art.

FIG. 1 illustrates a portion of an outboard drive assembly, indicated generally by the reference numeral 11, constructed in accordance with the prior art. By the term "outboard drive assembly", this is intended to cover either the outboard drive portion of an inboard/outboard marine drive or the construction embodied in an outboard motor.

The outboard drive 11 includes a driveshaft housing 12 and adjacent lower unit 13. A shaft 14 extends through an opening 15 in the driveshaft housing 12 and has affixed at its lower end, as by welding, a coupling member 16. The coupling member 16 is formed with a female splined opening 17 to receive the male spline 18 of a second shaft 19. Thus, the shafts 14 and 19 are connected for simultaneous rotation.

The shafts 14 and 19 along with the coupling member 16 may be employed to operate a transmission mechanism consisting of a forward, neutral, reverse drive of a known type positioned within the lower unit 13. Alternatively, the shafts 14 and 19 may provide any other remote control function from a level above the water to a position in the lower unit.

With the prior art construction as described, water may seep through the opening 15 around the shaft 14. The water may well contain contaminants that may cause wear in the spline connection 17, 18 to adversely affect the rotation transmitted from the shaft 14 to the shaft 19. Alternatively, if the engine is operated in salt water, the salt water may cause corrosion in the spline connection that has the same net effect. Furthermore, when the mechanism is used for operating a transmission, wear in the splines may cause chattering.

DETAILED DESCRIPTION OF THE PREFERRED EMBODIMENT

Figure 2:
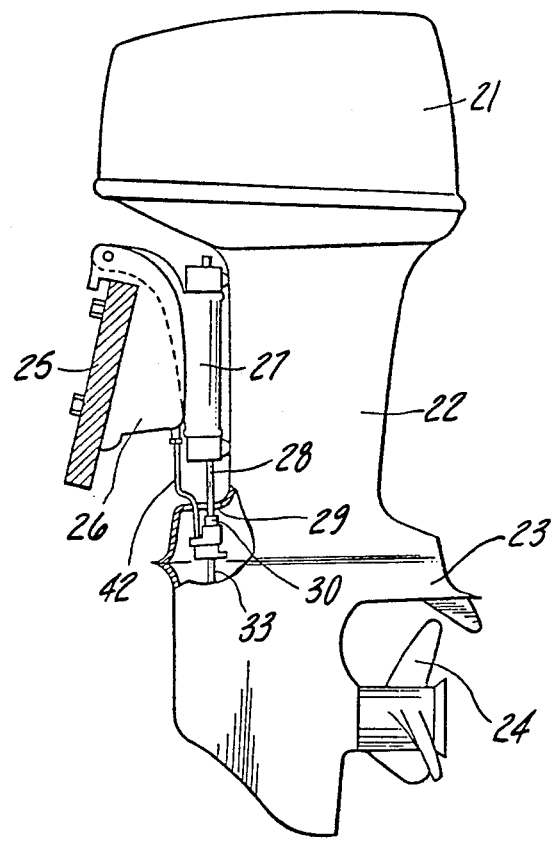
FIG. 2 is a side elevational view, with a portion broken away, of an outboard motor constructed in accordance with an embodiment of the invention.
Figure 3:
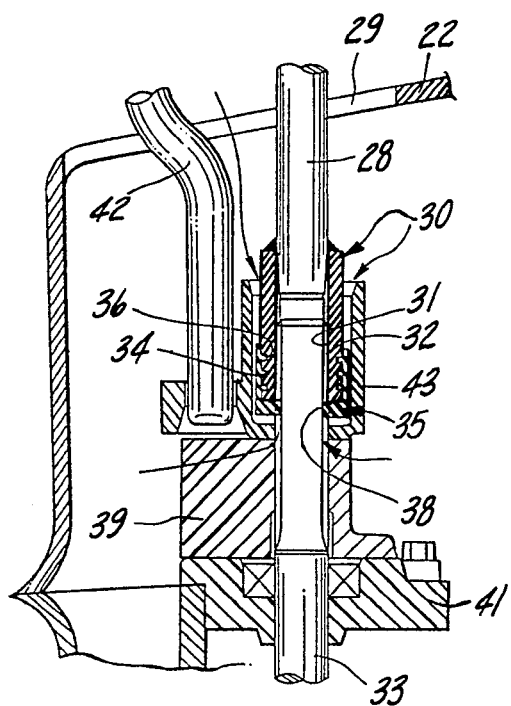
FIG. 3 is an enlarged cross-sectional view of the broken-away area in FIG. 2.
Figure 5:
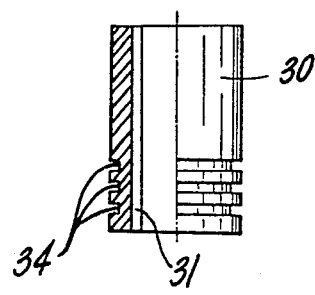
FIG. 5 is an enlarged view, shown partially in section, of the coupling member.
Figure 4:
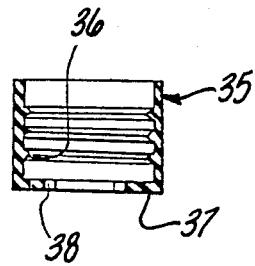
FIG. 4 is a still further enlarged cross-sectional view of the seal embodying the invention.

An outboard motor constructed in accordance with the invention is shown in FIGS. 2 and 3 and details of certain of the components appear in FIGS. 4 and 5. As has been noted above, although the invention is described in conjunction with an outboard motor, it may also be employed in conjunction with outboard drive units of a marine inboard/outboard assembly.

The outboard motor consists of a power head 21, a driveshaft housing 22 and a lower unit 23 in which a propeller 24 is journalled for rotation in a known manner. The power head 21 drives a driveshaft that is contained within the driveshaft housing 22 which, in turn, drives the propeller 24 through a suitable forward, neutral, reverse transmission. None of these components are shown in any detail since they may take any form as is known in this art.

The motor is mounted on a boat transom indicated by the reference numeral 25 by means of a clamping bracket 26. A swivel bracket 27 is pivotally supported on the clamping bracket 26 and, in turn, rotatably supports the driveshaft housing 21 for steering movement about the generally vertically-extending axis in a known manner.

The motor employs an operating structure for actuating the transmission consisting of a first shaft 28 that extends from a shift lever (now shown) through the swivel housing 27 and which passes at its lower end through an opening 29 in the driveshaft housing 22. As shown best in FIG. 3, a coupling member, indicated generally by the reference numeral 30 is affixed, as by welding, to the lower end of the first shaft 28. As with the prior art type of constructions, the coupling member 30 has a female splined opening 31 in which a male splined portion 32 of a second shaft 33 is positioned. The shaft 33 operates the shaft mechanism of the transmission in any known manner.

In accordance with the invention, the coupling member 30 is provided with one or more circumferential grooves 34 adjacent its lower end. A seal, indicated generally by the reference numeral 35, is provided which is formed from a suitable elastomeric material such as rubber or the like. The seal 35 is generally cylindrical in shape and is formed with a plurality of circumferentially-extending radial ribs 36 that are complementary in size and shape to the coupling member grooves 34 so as to provide a fixed connection between the seal 35 and the coupling member 30. In addition to providing a connection, the ribs 36 and grooves 34 afford a fluid tight seal between the seal 35 and the coupling member 30.

The seal 35 has a generally cup-like shape that includes a lower wall 37. An opening 38 of female splined configuration is formed in the lower wall 37. The splined opening 38 is sized so as to sealingly engage the splines 32 of the shaft 33. Thus, a seal is provided between the seal 35 and the shaft 33. This seal coupled with the seal formed between the seal 35 and the coupling member 30 will protect the splined engagement between the shaft 33 and the coupling member 30 from the ingress of foreign materials which may flow into the area through the opening 29 as indicated by the arrows in FIG. 3.

In addition to operating the transmission, the shaft 33 may be employed to operate a tilt lock mechanism. The tilt lock mechanism may be of any known type and is incorporated to prevent tilting of the swivel assembly 27 about its horizontal tilt axis with the clamping bracket 26. For this interconnection, a cam 39 is slidably supported upon a plate 41 that journals the upper end of the shaft 33. The cam 39 is adapted to cause reciprocation of a control rod 42 that is supported in a slide guide 43 that surrounds the coupling 30 and seal 35.

During servicing of the unit, the shaft 28 and attached coupling 30 may be removed by merely pulling these components upwardly relative to the shaft 33. The seal 35 will also be withdrawn because of its connection to the coupling 30 afforded by the ribs 36 and grooves 34. Thus, the elements may be readily disassembled. On the other hand, the parts may be reassembled in the reverse manner and the splined seal opening 38 will again sealingly engage the shaft splines 32. Because of the effective seal that is provided, the splined connection 31, 32 will not be subject to wear or the attack of foreign particles or corrosive elements. This sealing is achieved without adversely affecting the serviceability of the unit since the splined connection may be readily disassembled.

Although a preferred embodiment of the invention has been disclosed for connecting elements of a transmission shaft mechanism, it should be readily apparent that the invention is susceptible to any other use for transmitting motion to the lower unit of either an outboard motor or an inboard/outboard drive. Also, although the invention has been described in conjunction with a splined connection, it can be used in conjunction with any of the other well known types of connection for coupling one shaft to another. Various other changes and modifications may be made without departing from the spirit and scope of the invention, as defined by the appended claims.

I claim:

1. In a transmission control shaft connection for the outboard drive of a marine engine or the like comprising a first shaft, a second shaft and a coupling member affixed to said first shaft and operatively connected to said second shaft for disconnectably coupling said shafts together, the improvement comprising a seal member affixed to and carried by, and rotatable with said coupling member, sealingly engaged with said second shaft and enclosing the operative connection between said shafts for protecting the operative connection from the ingress of foreign matter, said second shaft, said coupling member and said member being axially movable relative to said first shaft for removal for service.

2. A shaft connection as set forth in claim 1, wherein the operative connection comprises a splined connection.

3. A shaft connection as set forth in claim 2, wherein the coupling member comprises an internally splined member affixed to the first shaft and the operative connection is formed by a male splined portion of the second shaft engaged with the internal splines of said internally splined member.

4. A transmission control shaft connection for the outboard drive of a marine engine or the like comprising a first shaft, a second shaft and a coupling member affixed to said first shaft and connected to said second shaft by a splined connection for coupling said shafts together, said splined connection comprising female splines formed by said coupling member and engaged with male splines formed on said second shaft, the improvement comprising a seal member affixed to said coupling member, sealingly engaged with said second shaft and enclosing the operative connection between said shafts for protecting the operative connection from the ingress of foreign matter, said seal member having a spline opening sealingly engaged with the splined portion of the second shaft.

5. A shaft connection for the outboard drive of a marine engine or the like comprising a first shaft, an internally splined member affixed to said first shaft, a second shaft and a male splined portion on said second shaft engaged with said internally splined member for coupling said shafts together, the improvement comprising a seal member affixed to said internally splined member, said seal member having rib means cooperating with groove means formed on said internally splined member for coupling said seal means to the first shaft and a splined opening sealingly engaged with the male splined portion of the second shaft.

* * * * *

UNITED STATES PATENT AND TRADEMARK OFFICE
CERTIFICATE OF CORRECTION

PATENT NO. : 4,493,662

DATED : January 15, 1985

INVENTOR(S) : Michihiro Taguchi

It is certified that error appears in the above-identified patent and that said Letters Patent is hereby corrected as shown below:

Column 2, line 46
"now" should be --not--.

Column 2, line 55
"shaft" should be --shift--.

Column 4, line 15, claim 1

Before "member being" insert --seal--.

Signed and Sealed this

Fourteenth Day of January 1986

[SEAL]

Attest:

DONALD J. QUIGG

Attesting Officer

Commissioner of Patents and Trademarks